April 26, 1949.　　　　　K. Y. MESSICK　　　　　2,468,095
VEHICLE FOR TRANSPORTING AND HANDLING
MATERIAL IN STACKS
Filed May 13, 1946　　　　　　　　　　　　　　　5 Sheets-Sheet 1

Inventor
Kirwan Y. Messick
By Shepherd Campbell
Attorneys

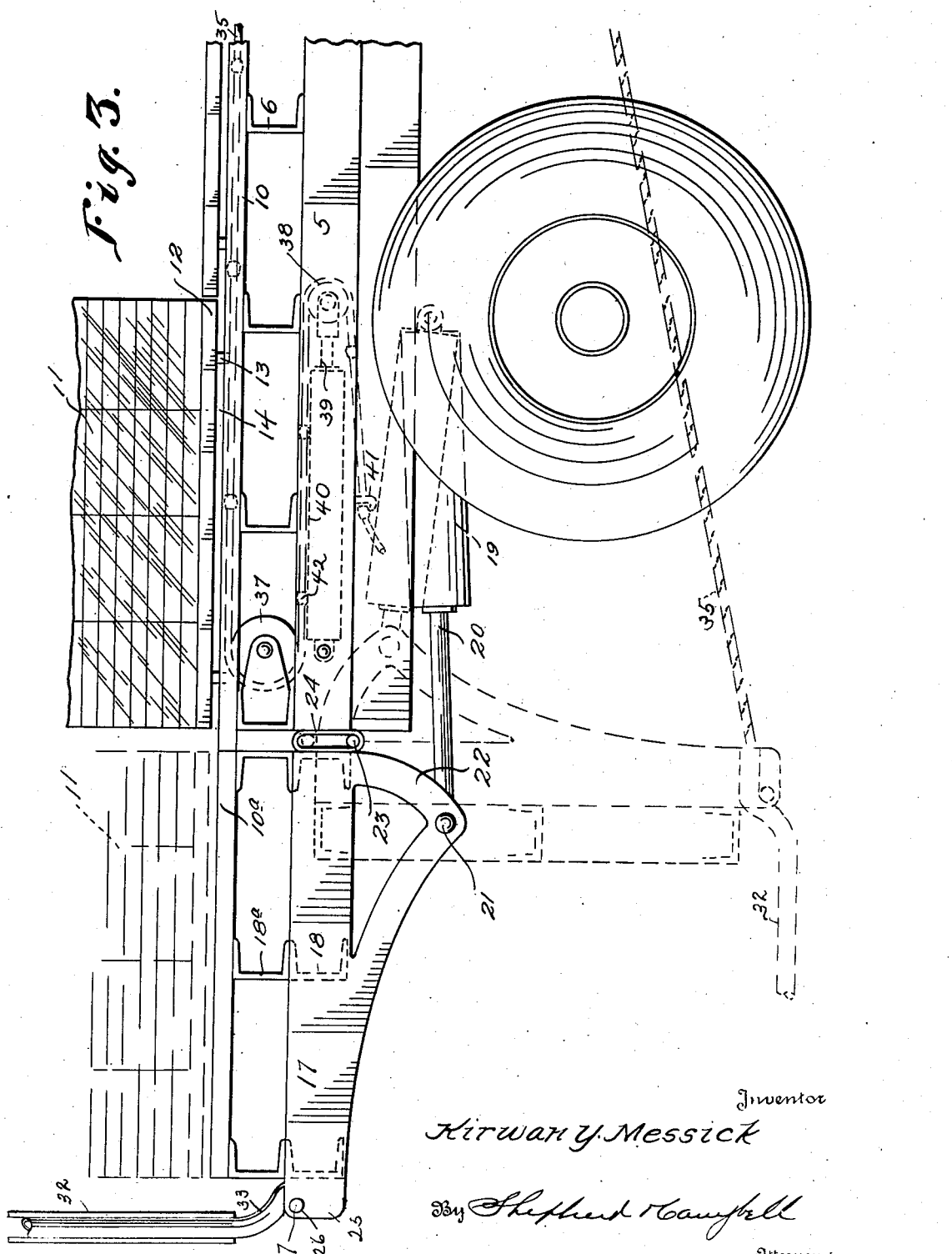

April 26, 1949.　　　　K. Y. MESSICK　　　　2,468,095
VEHICLE FOR TRANSPORTING AND HANDLING
MATERIAL IN STACKS
Filed May 13, 1946　　　　　　　　　　　　　5 Sheets-Sheet 3
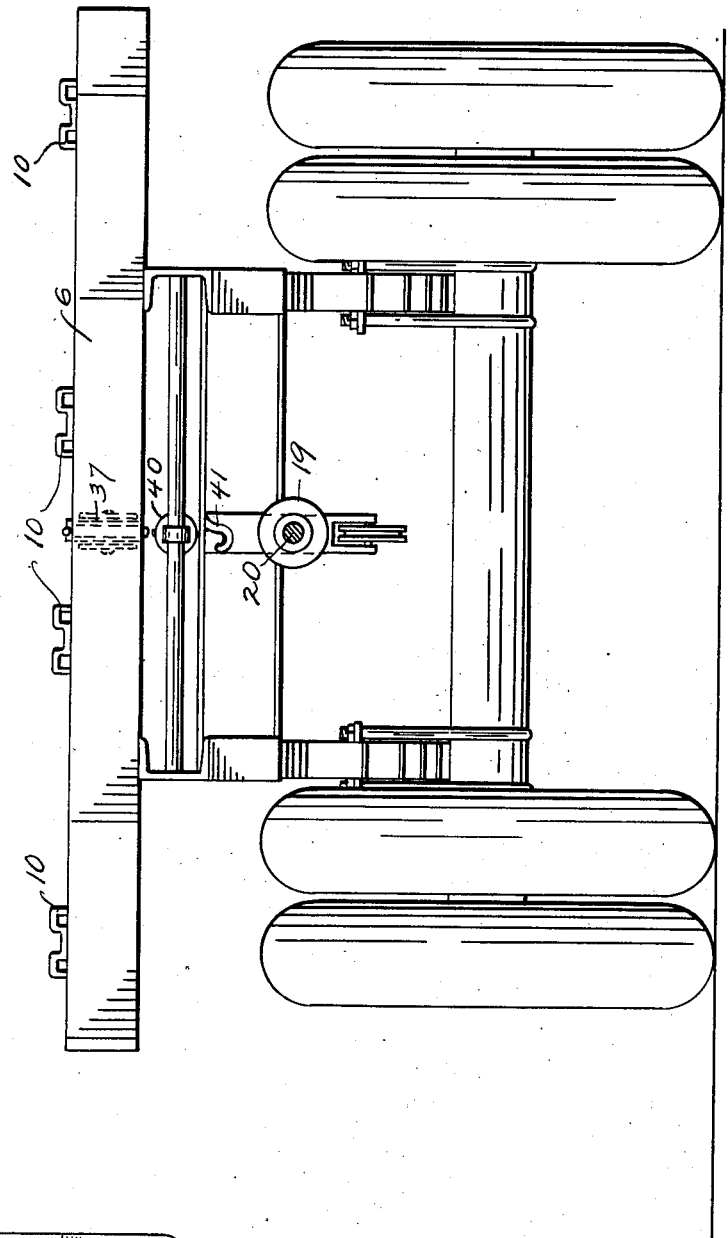
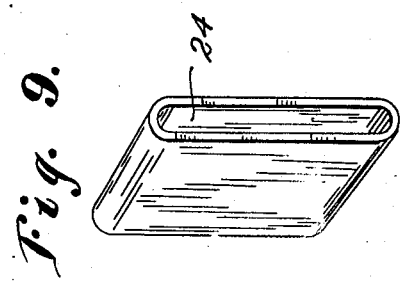
Inventor
Kirwan Y. Messick
By Shephard & Campbell
Attorneys

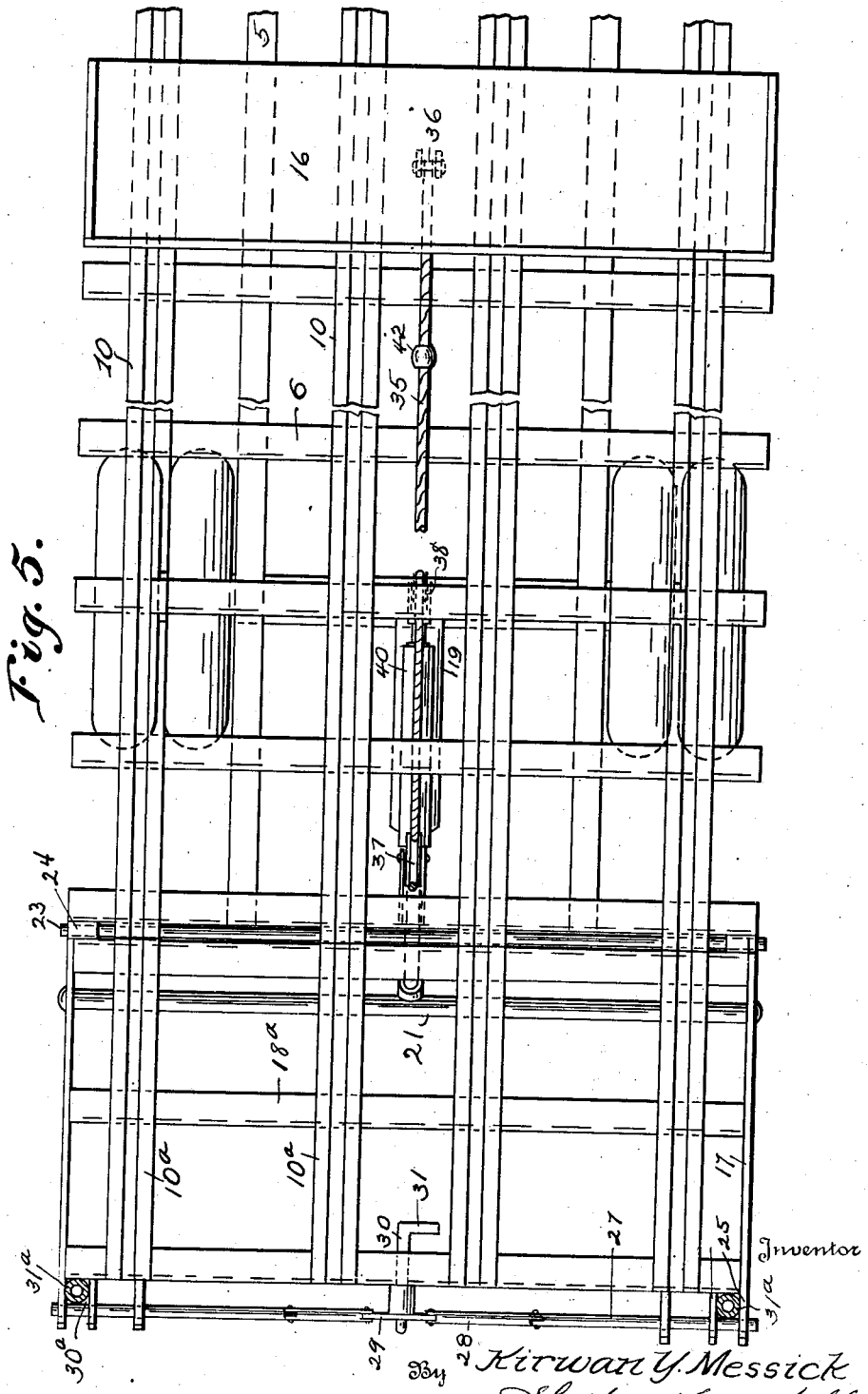

April 26, 1949.
K. Y. MESSICK
2,468,095
VEHICLE FOR TRANSPORTING AND HANDLING
MATERIAL IN STACKS
Filed May 13, 1946
5 Sheets-Sheet 5
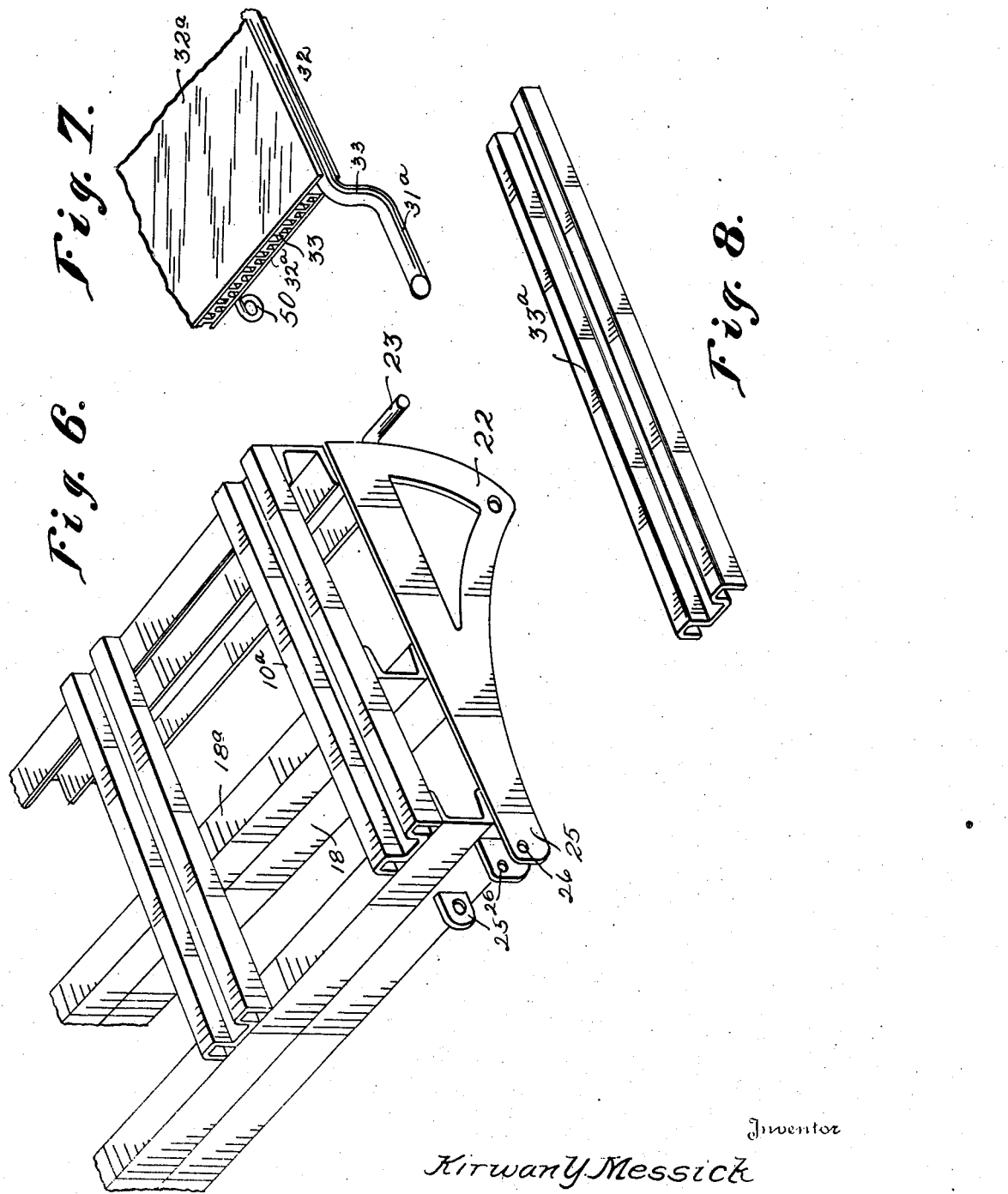
Inventor
Kirwan Y Messick
By Shepherd & Campbell
Attorneys Patented Apr. 26, 1949

2,468,095

UNITED STATES PATENT OFFICE 2,468,095

VEHICLE FOR TRANSPORTING AND HANDLING MATERIAL IN STACKS

Kirwan Y. Messick, Arlington County, Va.

Application May 13, 1946, Serial No. 669,326

17 Claims. (Cl. 214—77)

1

The present invention relates to a vehicle for transporting material in stacks and for unloading said stacks when the vehicle reaches its destination. The device of the invention is particularly useful in handling bricks and like relatively small but heavy units and the invention will be described as it relates to a brick handling vehicle. However the invention is not limited to the handling of bricks.

I am aware of the fact that it has heretofore been proposed to provide brick handling trucks with mechanism for transferring stacks of bricks from the truck to the ground while maintaining the stack formation. However all of the devices of this nature with which I am familiar have involved the use of pallets upon which the bricks were stacked before being placed on the trucks and which pallets were transferred to the ground with the brick and left there upon the departure of the truck.

These pallets are somewhat expensive and it has been found that there is a large loss of them when they are left on a job. Many of them are never retrieved. Workmen use them for firewood and other trucks drive over them and break them up.

It is a basic and highly important feature of the present invention that while the bricks are deposited in stacked formation upon the ground, without shock or jar, nothing is left upon the ground except the bricks themselves. While I use pallets, the bricks are so handled that the pallets may be retrieved and returned to the brick yard by the same truck which delivers the bricks.

The invention will be best understood by reference to the accompanying drawings wherein:

Fig. 3 is an enlarged side elevation of the rear end of the trailer.

Fig. 4 is a rear end elevation of the trailer with the unloading platform omitted.

Fig. 5 is a plan view of the trailer.

Fig. 6 is a perspective view of a tipping or unloading platform, hereinafter described.

Fig. 7 is a perspective view of a portion of an end barrier or tail gate, hereinafter described.

Fig. 8 is a perspective view of a part of the reinforcing means employed to stiffen the structure of Fig. 7 and Fig. 9 is a detail view of one of the hinge elements employed to connect the structure of Fig. 6 to the rear end of the trailer body proper.

Figures 1, 2:
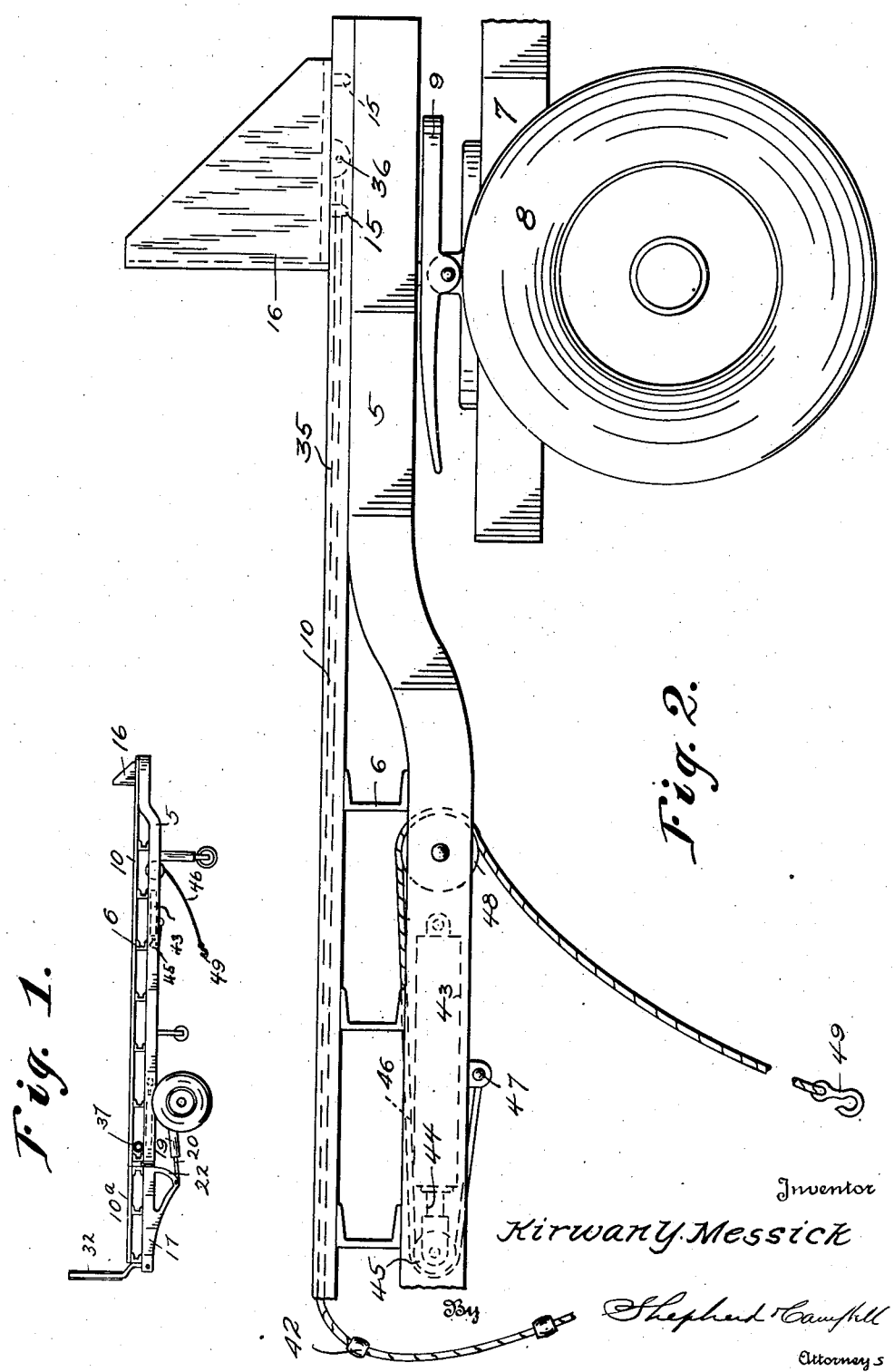
Fig. 1 is a diagrammatic side view illustrating the general assembly of a brick handling trailer constructed in accordance with the invention.
Fig. 2 is an enlarged side elevation of the forward portion of said trailer.

The invention may be embodied in a trailer truck of the character illustrated in Fig. 1, wherein the proposed mechanism is moved by a separate towing unit or it may be embodied in a truck of the type wherein the engine is permanently attached to the truck.

In the particular form of the invention which I have chosen for purposes of illustration I provide a trailer, the body of which consists of longitudinal sills 5 and transverse supporting members 6, preferably of channel iron. The forward end of the trailer is adapted to be engaged with the rear end of a conventional towing unit, the frame member of which is indicated at 7 and a rear wheel of which is indicated at 8. The latch mechanism 9 for connecting the forward end of the trailer with the rear end of the towing unit is also of a conventional type and forms no part of the present invention. A plurality of longitudinally extending members 10 (see Figs. 4 and 5) are mounted upon the transverse members 6 and constitute track ways for stacks of brick 11. The brick are stacked upon pallets 12 and these pallets have downwardly extending teats 13 upon their bottoms which engage in the track ways. The bottoms of the pallets are disposed high enough above the track ways to leave a space 14 so that the pallets with the stacks of brick thereon may be deposited in place, at the brick yard, by conventional loading trucks which form no part of the present invention. These loading trucks are, in effect, wheeled elevators which pick up articles of various kinds, elevate them from the ground, transport them to a desired point and deposit them at a desired elevation. By leaving the spaces 14 the arms of these loading trucks (not shown) may be laterally withdrawn by moving the loading truck bodily away from the trailer, after the stacks of bricks have been deposited upon the track ways.

The track ways also receive teats 15 (Fig. 1) which project downwardly from the bottom of an ejector or follower 16. The function of this follower is to thrust the stacks of brick and the pallets upon which they are mounted from the trailer on to corresponding track ways 10a of a tiltable platform. This platform is made up of the side members 17 and stout transverse braces 18 and 18a upon which the tracks 10a are supported. This platform is adapted to swing from the full line to the dotted line position illustrated in Fig. 3.

This vertical swinging movement of the platform is effected by means of a conventional hydraulic cylinder 19, the plunger 20 of which is pivotally connected at 21 to downwardly projecting ears 22 of the platform. The platform carries pintles 23 (Figs. 2 and 6) which in conjunction with the loops 24 (Figs. 3 and 9) constitute a sliding hinge connection between the platform and the rear end of the trailer body. Any suitable form of hinge connection adapted to permit the parts to have the necessary movement may be employed. In the particular form shown, the loops 24 are welded or otherwise firmly secured to the rear ends of the sills 5. However, it is apparent that simple slots formed in the rear ends of the sills would serve the same purpose.

The rear end of the tilting platform (see Fig. 6) is provided with outstanding ears 25, said ears being perforated at 26 for the reception of pins 27. These pins are actuated by links 28 from crank arms 29 upon shaft 30. This shaft may be turned by means of a crank handle 31, and by swinging this handle 31 the pins may be retracted or projected. When projected they span the openings 30 between the ears 25 and close the rear sides of said openings and thereby form closed pockets within which the lower ends of the standards 31 of a barricade or a tailgate 32, are received. This tailgate is best illustrated in Fig. 7, and by reference to this figure it will be seen that the standards have the offset portions 33 formed therein. Since, in the tipping of the platform, the stacks of bricks are going to be tipped from their original position (where they rested upon their bottoms) to a position where the stacks as a whole will rest upon their sides upon the tailgate 32, it follows that the tailgate must be of a strong and rugged construction. I may resort to many ways of constructing this element. In the particular form shown in Fig. 7 it consists of the two side plates 32a which are held in spaced relation by internal bracing, consisting of the zigzag channel construction 33 illustrated in Fig. 8. The plates 32a may be of steel and may be welded, riveted or otherwise secured to the standards 31. I wish to emphasize the fact that the particular construction of this end gate is immaterial. It is only necessary that it be of a nature to prevent the bricks from moving off of the platform during transit from the brick yard to the job and to receive and support the bricks when the platform is tipped from the horizontal to the vertical, and that it be of such a nature that it may be bodily withdrawn from beneath the stack of bricks after the platform has reached the dotted line of Fig. 3, to thereby leave the bricks in a stack upon the ground. Since at this time the bricks will have been tipped from the pallets, the pallets may be retrieved and along with the end gate may be returned to the brick yard by the same truck or trailer which brought them to the job. This capability of the device of my invention of transporting bricks from brick yard to job and unloading them upon the ground in stacked formation while leaving behind nothing but the bricks themselves when the truck returns to the brick yard, constitutes a highly important feature of the invention. It saves time, trouble and especially expense.

Any suitable means may be resorted to for moving the ejector or follower 16. The way proposed in the particular embodiment illustrated is to attach a light but strong cable 35 to the bottom of the follower as at 36 (Fig. 2). This cable passes over an idler pulley 37 fixed to the rear end of the trailer body, then over a pulley 38 that is carried by the plunger 39 of a hydraulic cylinder 40. The cable is then carried through hook 41 upon the trailer body. The cable has clamped upon it at suitable intervals any desired number of protuberant bodies 42. These may be merely lumps of lead tightly gripped upon the cable. They are of such a nature as to pass readily over the pulleys. When engaged with the hook 41 they serve to prevent movement of the end portion of the cable to the right through the hook, in Fig. 3, and thus in effect to dead end the cable at that point. Then when pressure fluid is admitted to cylinder 40 the outward movement of plunger 39 and pulley 38 (Fig. 3) will draw upon the top run of the cable and thus move the ejector 16 to the left in Fig. 2. This in turn pushes one stack of bricks over upon the platform, it being understood that with the cable deadended in the fashion described the movement of the ejector will be substantially double the stroke of plunger 39. When the plunger is retracted the slack in the cable may be taken up by pulling it through the hook until another of the protuberant members 42, upon the cable may be engaged behind the hook. When this is done another outward stroke of the plunger 39 will result in imparting a further movement to the ejector 16 to thereby force the next stack of bricks over the platform, it being understood that this is not done until after the first stack has been deposited upon the ground and the platform has been returned to the full line position of Fig. 3.

A hydraulic cylinder 43 (Fig. 2) has its conventional plunger 44 provided with a pulley 45 over which a cable 46 passes. This cable is deadended at 47. It passes over an idler pulley 48 and its free end is provided with a hook 49 that is adapted to engage in an eye 50 that is carried by the tail-gate 32. After the swinging platform has been moved to the dotted line position of Fig. 3 the driver engages the hook 49 with the eye 50. By then admitting pressure fluid to cylinder 43 the cable 46 may be forcibly drawn upon to pull the end gate bodily from beneath the stack of brick, leaving said stack resting upon the ground. By providing the offsets 33 in the standards 31 slight inequalities in the ground are accommodated and the end gate is caused to engage the ground while leaving the end of the platform slightly above the ground level. This facilitates the withdrawal of the end gate. It is to be noted that the action of withdrawing the end or tail gate is independent of the bodily movement of the vehicle. Therefore this action may be effected with the vehicle stationary and with the platform hanging vertically. Since the movement of the end gate is toward the vertical wall constituted by the face of the platform, it follows that any movement of the stack of bricks would be toward said wall and the latter would act to steady the stack during the movement of the end gate from beneath said stack.

While I have shown the swinging platform as being engaged with the rear end of a wheeled body, it is apparent that the invention would be capable of being carried out by means of a like platform swingingly engaged with a side of the body. It is therefore to be understood that the invention includes within its purview whatever changes fairly come within either the terms or the spirit of the appended claims irrespective of where the swinging platform may be mounted.

By making the pallets 12 of metal or other substances capable of resisting the heat in a brick kiln, bricks may be transferred from the kiln to the job where they are to be used without being touched by human hands and at an enormous saving of time and expense, as well as much very hard work.

Any suitable type of power units may be substituted for the hydraulic cylinders without departure from the invention.

Having described my invention, what I claim is:

1. A truck of the character described comprising a wheeled body constructed to receive a plurality of stacks of brick mounted upon pallets, a swinging platform mounted to move from a substantially horizontal to a substantially vertical position, an end gate at the outer end of said platform, means for moving the stacks from the body on to the platform when the latter is in its horizontal position, means for swinging the platform downwardly to tip the stacks over so that they lie upon their sides upon the end gate when the platform approaches the vertical and power means upon the truck acting independently of the bodily movement of the truck for withdrawing the end gate from beneath the stack to leave said stack resting directly upon the ground.

2. A truck of the character described comprising a wheeled body constructed to receive a plurality of stacks of brick mounted upon pallets, a swinging platform mounted to move from a substantially horizontal to a substantially vertical position, an end gate at the outer end of said platform, means for moving the stacks from the body on to the platform when the latter is in its horizontal position, means for swinging the platform downwardly to tip the stacks over so that they lie upon their sides upon the end gate when the platform approaches the vertical and power means upon the truck acting independently of the bodily movement of the truck for withdrawing the end gate from beneath the stack to leave said stack resting directly upon the ground, the tipping of the stacks as recited leaving the pallets free for removal.

3. A structure as recited in claim 1 wherein the means for moving the stacks from the body to the platform comprises a hydraulic cylinder and means actuated by said cylinder acting upon said stacks for moving the same.

4. A structure as recited in claim 1 wherein the means for moving the stacks from the body to the platform comprises an ejector bearing against the innermost stack and power means for moving said ejector.

5. A structure as recited in claim 1 wherein the means for moving the stacks from the body to the platform comprises an ejector bearing against the innermost stack and power means for moving said ejector, said power means comprising a hydraulic cylinder, a cable engaged with the ejector and means actuated by the hydraulic cylinder for engaging the cable to draw upon the same and actuate said ejector.

6. A structure as recited in claim 1 wherein the wheeled body is provided upon its surface with a plurality of longitudinal trackways and wherein the pallets are provided with members adapted to engage in said trackways.

7. A structure as recited in claim 1 wherein the wheeled body is provided upon its surface with a plurality of longitudinal trackways and wherein the pallets are provided with members adapted to engage in said trackways, said ejector likewise being provided with guide members engageable in said trackways.

8. A structure as recited in claim 1 wherein the means for withdrawing the end gate comprises a hydraulic cylinder and connections between said cylinder and said end gate for moving the latter under the power of said cylinder.

9. A structure as recited in claim 1, wherein the means for withdrawing the end gate from beneath the stack comprises a cable, means whereby the cable may be attached to the end gate, and power means for drawing upon said cable.

10. A structure as recited in claim 1 wherein the means for withdrawing the end gate from beneath the stack, comprises a cable means whereby the cable may be attached to the end gate, and a hydraulic cylinder upon the truck for drawing upon said cable to not only withdraw the end gate but to move the stack toward and against the then vertical platform to be steadied by the latter until the withdrawal of the end gate is completed.

11. In combination a wheeled vehicle means for supporting a plurality of pallets, each carrying a stack of loose material, upon said vehicle, a platform hinged to said vehicle to swing from a substantially horizontal to a substantially vertical position, means for moving the pallets with their stacks of material successively onto said platform, an end gate, retaining means carried by the outer end of the platform for releasably engaging said end gate and holding it in a perpendicular position with respect to the platform and at the outer end of the platform and power means acting independently of the bodily movement of the vehicle for moving the end gate from beneath a stack and toward the platform when the said platform is in vertical position and the retaining means is released, whereby the presence of the platform is utilized to aid in steadying the stack of loose material as the end gate is withdrawn from beneath said stack.

12. In combination a wheeled vehicle means for supporting materials in stacks thereon, a platform hinged to said vehicle to swing from a substantially horizontal to a substantially vertical position, an end gate, retaining means carried by the outer end of the platform for releasably engaging said end gate and holding it in a perpendicular position with respect to the platform and means for moving the end gate from beneath a stack and toward the platform when the end gate is in vertical positon and the retaining means is released, said means for moving the end gate comprising a power unit upon the wheeled body, a cable actuated thereby and interengaging means upon the cable and end gate.

13. A structure as recited in claim 11 wherein the end gate comprises a body portion and a plurality of standards, means projecting from the rear end of the platform and lying in such spaced relation as to form pockets to receive the standards between them and manually operable closure members for closing the rear sides of said pockets.

14. A structure as recited in claim 11 wherein the end gate comprises a body portion and a plurality of standards, means projecting from the rear end of the platform and lying in such spaced relation as to form pockets to receive the standards between them, pins traversing the open sides of said pockets and manually operable means for actuating said bolts.

15. A structure as recited in claim 11 wherein the end gate comprises a body portion and a plurality of standards, means projecting from the read end of the platform and lying in such spaced relation as to form pockets to receive the standards between them and manually operable closure members for closing the rear sides of said pockets, those portions of the standards which enter the pockets being offset with respect to the body portion of the end gate in a direction to throw said body portion away from the platform.

16. A brick delivery structure comprising a wheeled body, a plurality of longitudinal trackways upon said body, a plurality of pallets provided with guide means adapted to engage with said trackways, a platform hinged at its inner edge with respect to the wheeled body, a follower engaged with the trackways and thrusting against the innermost pallet to successively thrust said pallets and the stacks of material thereon from the wheeled body and on to the hinged platform, said platform being capable of limited vertical movement with respect to the wheeled body at its point of hinging, portions upon said platform which project below the point of hinging of the same, a hydraulic cylinder and plunger acting upon said portions to swing said platform from a horizontal to a vertical position, an end gate, releasable manually operable means for latching the end gate to the outer end of the platform, a power unit, a cable adapted to be drawn upon by said power unit and interengaging means between the cable and the end gate.

17. A truck of the character described comprising a wheeled body constructed to receive a plurality of stacks of brick mounted upon pallets, a swinging platform mounted to move from a substantially horizontal to a substantially vertical position, an end gate at the outer end of said platform, means for moving the stacks from the body on to the platform when the latter is in its horizontal position, means for swinging the platform downwardly to tip the stacks over so that they lie upon their sides upon the end gate when the platform approaches the vertical and power means upon the truck acting independently of the bodily movement of the truck for withdrawing the end gate from beneath the stack, the direction of withdrawal of the end gate being toward the forward end of the truck, such direction of movement of the end gate carrying the stack of material toward and against the rear face of the then vertical platform.

KIRWAN Y. MESSICK.

REFERENCES CITED

The following references are of record in the file of this patent:

UNITED STATES PATENTS

| Number | Name | Date |
|---|---|---|
| 1,252,899 | Greer et al. | Jan. 8, 1918 |
| 1,297,486 | Murray | Mar. 18, 1919 |
| 1,498,732 | Jauch | June 24, 1924 |
| 1,526,993 | Luce | Feb. 17, 1925 |
| 1,567,478 | Vonnez et al. | Dec. 29, 1925 |
| 1,945,426 | Evoy | Jan. 30, 1934 |
| 2,232,197 | Anthony | Feb. 18, 1941 |
| 2,239,151 | Hope | Apr. 22, 1941 |
| 2,308,648 | DeVry et al. | Jan. 19, 1943 |
| 2,318,886 | Paiement | May 11, 1943 |
| 2,348,993 | Novotney | May 16, 1944 |
| 2,412,155 | Jessen | Dec. 3, 1946 |

FOREIGN PATENTS

| Number | Country | Date |
|---|---|---|
| 375,266 | Germany | May 11, 1923 |